(12) United States Patent
Karlson et al.

(10) Patent No.: US 8,782,527 B2
(45) Date of Patent: Jul. 15, 2014

(54) COLLABORATIVE PHONE-BASED FILE EXCHANGE

(75) Inventors: Amy Karlson, Columbia, MD (US); George Robertson, Seattle, WA (US); Brian Meyers, Issaquah, WA (US); Gregory Smith, Bellevue, WA (US); Mary Czerwinski, Woodinville, WA (US)

(73) Assignee: Microsoft Corp., Redmond, WA (US)

( * ) Notice: Subject to any disclaimer, the term of this patent is extended or adjusted under 35 U.S.C. 154(b) by 1642 days.

(21) Appl. No.: 11/769,399

(22) Filed: Jun. 27, 2007

(65) Prior Publication Data

US 2009/0006972 A1    Jan. 1, 2009

(51) Int. Cl.
*G06F 15/177* (2006.01)

(52) U.S. Cl.
USPC .......................................................... 715/737

(58) Field of Classification Search
USPC ........................... 715/737, 740, 748; 709/217
See application file for complete search history.

(56) References Cited

U.S. PATENT DOCUMENTS

| | | | |
|---|---|---|---|
| 6,401,085 B1 | 6/2002 | Gershman et al. | |
| 6,564,246 B1 | 5/2003 | Varma et al. | |
| 6,975,622 B2 | 12/2005 | Korycki et al. | |
| 2002/0078209 A1* | 6/2002 | Peng | 709/227 |
| 2002/0124188 A1* | 9/2002 | Sherman et al. | 713/201 |
| 2002/0138624 A1* | 9/2002 | Esenther | 709/227 |
| 2002/0194272 A1 | 12/2002 | Zhu | |
| 2003/0041108 A1* | 2/2003 | Henrick et al. | 709/205 |
| 2003/0159136 A1* | 8/2003 | Huang et al. | 717/171 |
| 2003/0167318 A1* | 9/2003 | Robbin et al. | 709/221 |
| 2003/0208541 A1* | 11/2003 | Musa | 709/205 |
| 2004/0034723 A1* | 2/2004 | Giroti | 710/8 |
| 2004/0153504 A1 | 8/2004 | Hutchinson et al. | |
| 2004/0203378 A1* | 10/2004 | Powers | 455/41.2 |
| 2004/0249884 A1* | 12/2004 | Caspi et al. | 709/204 |
| 2005/0004982 A1* | 1/2005 | Vernon et al. | 709/204 |
| 2005/0008000 A1* | 1/2005 | Korycki et al. | 370/352 |
| 2005/0027871 A1* | 2/2005 | Bradley et al. | 709/227 |
| 2005/0034079 A1* | 2/2005 | Gunasekar et al. | 715/753 |
| 2005/0050441 A1* | 3/2005 | Kearney | 715/500 |
| 2005/0059418 A1* | 3/2005 | Northcutt | 455/517 |
| 2005/0085243 A1* | 4/2005 | Boyer et al. | 455/463 |
| 2005/0198029 A1* | 9/2005 | Pohja et al. | 707/8 |
| 2005/0218739 A1* | 10/2005 | Maddin et al. | 310/120 |
| 2005/0235015 A1* | 10/2005 | Abanami et al. | 707/204 |
| 2005/0256870 A1* | 11/2005 | Benco et al. | 707/9 |

(Continued)

OTHER PUBLICATIONS

Ahn, J., J. S. Pierce, SEREFE: Serendipitous file exchange between users and devices, ACM Int'l Conf. Proc. of the 7th Int'l Conf. on Human Comp. Interaction with Mobile Devices and Services, 2005, pp. 39-46, vol. 111, Salzburg, Austria.

(Continued)

*Primary Examiner* — Enrique Iturralde
(74) *Attorney, Agent, or Firm* — Dan Choi; Carole Boelitz; Micky Minhas

(57) ABSTRACT

A collaborative phone-based file exchange technique that wirelessly synchronizes a user's work context with his or her mobile phone and makes this context readily available and sharable in collaborative situations. When the user is away from their desk, collaboration with others is possible by sharing/downloading between the mobile phone and a paired PC, which may be a colleague's computer or a meeting room workstation/computer. When the user returns to their office, any recently downloaded files are automatically synchronized back to their office PC.

9 Claims, 11 Drawing Sheets

(56) References Cited

U.S. PATENT DOCUMENTS

| | | | |
|---|---|---|---|
| 2005/0258806 A1* | 11/2005 | Janik et al. | 320/155 |
| 2005/0262201 A1* | 11/2005 | Rudolph et al. | 709/205 |
| 2005/0278642 A1 | 12/2005 | Chang et al. | |
| 2005/0281248 A1* | 12/2005 | Aoki et al. | 370/351 |
| 2006/0009215 A1* | 1/2006 | Bogod et al. | 455/433 |
| 2006/0010206 A1* | 1/2006 | Apacible et al. | 709/205 |
| 2006/0041893 A1* | 2/2006 | Castro et al. | 719/320 |
| 2006/0050686 A1 | 3/2006 | Velez-Rivera et al. | |
| 2006/0080432 A1* | 4/2006 | Spataro et al. | 709/224 |
| 2006/0230030 A1* | 10/2006 | Volpa et al. | 707/3 |
| 2006/0245530 A1* | 11/2006 | Pradhan et al. | 375/364 |
| 2007/0027960 A1* | 2/2007 | De Leon | 709/217 |
| 2007/0050448 A1* | 3/2007 | Gonen et al. | 709/204 |
| 2007/0078931 A1 | 4/2007 | Ludwig et al. | |
| 2007/0156813 A1* | 7/2007 | Galvez et al. | 709/204 |
| 2007/0162661 A1* | 7/2007 | Fu et al. | 710/62 |
| 2007/0276783 A1* | 11/2007 | Fernandez | 707/1 |
| 2007/0282848 A1* | 12/2007 | Kiilerich et al. | 707/10 |
| 2008/0082608 A1* | 4/2008 | Ho et al. | 709/204 |
| 2008/0109852 A1* | 5/2008 | Kretz et al. | 725/62 |
| 2008/0232371 A1* | 9/2008 | Hildreth et al. | 370/392 |
| 2008/0285736 A1* | 11/2008 | Balk et al. | 379/219 |
| 2009/0150968 A1* | 6/2009 | Ozzie et al. | 726/1 |
| 2009/0181659 A1* | 7/2009 | Stalnacke et al. | 455/416 |

OTHER PUBLICATIONS

Ballagas, R., M. Rohs, J. G. Sheridan, Sweep and point and shoot: phonecam-based interactions for large public displays, Conf. on Human Factors in Computing Systems, CHI '05, 2005, pp. 1200-1203, Portland, OR, USA.

Biehl, J. T., B. P. Bailey, Improving interfaces for managing applications in multiple-device environments, Proc. of the Working Conf. on Advanced Visual Interfaces, 2006, pp. 35-42, Venezia, Italy.

Booth, K. S., B. D. Fisher, C. J. R. Lin, R. Argue, The "mighty mouse" multi-screen collaboration tool, Proc. of the 15th Annual ACM Symposium on User Interface Software and Tech., 2002, pp. 209-212, Paris, France.

Druin, A., J. Stewart, D. Proft, B. Bederson, J. Hollan, KidPad: A design collaboration between children, technologists, and educators, Proceedings of the SIGCHI Conf. on Human Factors in Computing Systems, 1997, pp. 463-470, Atlanta, Georgia, United States.

Edwards, W.K., M. W. Nnewman, J. Z. Sedivy, T. F. Smith, D. Balfanz, D. K. Smetters, H. C. Wong, S. Izadi,Using speakeasy for ad hoc peer-to-peer collaboration, Proc. of ACM Computer Supported Cooperative Work, 2002, Nov. 16-20, 2002, pp. 256-265, New Orleans, Louisiana, USA.

Greenberg, S., M. Boyle, and J. Laberg, PDAs and shared public displays: Making personal information public, and public information personal, Personal Tech., Mar. 1999, pp. 54-64, vol. 3, No. 1.

Hutchings, D. R., G. Smith, B. Meyers, M. Czerwinski, G. Robertson, Display space usage and window management operation comparisons between single monitor and multiple monitor users, Proc. of the Working Conf. on Advanced Visual Interfaces, 2004, pp. 32-39, Gallipoli, Italy.

Izadi, S., H. Brignulli, T. Rodden, Y. Rogers, and M. Underwood, Dynamo: A public interactive surface supporting the cooperative sharing and exchange of media, Proc. of the 16th Annual ACM Symposium on User Interface Software and Tech., 2003, pp. 159-168, Vancouver, Canada.

Johanson, B., A. Fox, T. Winograd, The interactive workspaces project: Experiences with ubiquitous computing rooms, IEEE Pervasive Computing, Apr. 2002, pp. 67-74, vol. 1, No. 2.

Johanson, B., G. Hutchins, T. Winograd, M. Stone, PointRight: Experience with flexible input redirection in interactive workspaces, Proc. of the 15th Annual ACM Symposium on User Interface Software and Tech., 2002, pp. 227-234, Paris, France.

Lamming, M., M. Eldridge, M. Flynn, C. Jones, and D. Pendlebury, Satchel: Providing access to any document, any time, anywhere, ACM Transactions on Computer-Human Interaction, 2000, pp. 322-352, vol. 7, No. 3.

Myers, B. A., H. Stiel, R. Gargiulo, Collaboration using multiple PDAs connected to a PC, Proc. of the 1998 ACM Conf. on Comp. Supported Cooperative Work, 1998, pp. 285-294, Seattle, Washington, United States.

Rekimoto, J., Pick-and-Drop: A direct manipulation technique for multiple computer environments, Proceedings of the 10th Annual ACM Symposium on User Interface Software and Tech., Oct. 1997, pp. 31-39, Banff, Alberta, Canada.

Rekimoto, J., and M. Saitoh, Augmented surfaces: A spatially continuous work space for hybrid computing environments, Proc. of the Conf. on Human Factors in Computing Systems. May 1999, pp. 378-385, Pittsburgh, USA.

Ryan, N., Smart environments for cultural heritage, Reading the Historical Spatial Information in the World, 24th Int'l Symposium, Feb. 2005, Kyoto, Japan.

Shen, C., K. Everitt, K. Ryall, UbiTable: Impromptu face-to-face collaboration on horizontal interactive surfaces, Proc. of the Fifth Int'l Conf. on Ubiquitous Computing, 2003, pp. 281-288, Seattle, Washington, USA.

Sobti, S., N. Garg, F. Zheng, J. Lai, Y. Shao, C. Zhang, E. Ziskind, A. Krishnamurthy, and R. Wang, Segank: A distributed mobile storage system, Proc. of the Third USENIX Conf. on File and Storage Tech., Mar. 31-Apr. 2, 2004, pp. 239-252, San Francisco, CA.

Stefik, M., G. Foster, D. G. Bobrow, K. Kahn, S. Lanning and L. Suchman, Beyond the chalkboard: Computer support for collaboration and problem solving in meetings, Comm. of the ACM, Jan. 1987, pp. 32-47, vol. 30, No. 1, ACM Press.

Streitz, N. A., J. Geißler, T. Holmer, S. Konomi, C. Müller-Tomfelde, W. Reischi, P. Rexroth, P. Seitz, and R. Steinmetz, i-Land: An interactive landscape for creativity and innovation, Proc. of the CHI 1999 Conf. on Human Factors in Computing Systems, 1999, pp. 120-127.

Tan, D. S., B. Meyers, M. Czerwinski, WinCuts: Manipulating arbitrary window regions for more effective use of screen space, Extended Abstracts at CHI 2004 Conf. on Human Factors in Computing Systems, 2004, pp. 1525-1528.

Voida, S., W. K. Edwards, M. W. Newman, R. E. Grinter, N. Ducheneaut, Share and share alike: Exploring the user interface affordances of file sharing, Proc. of CHI, 2006, pp. 221-230.

Want, R., T. Pering, G. Danneels, M. Kumar, M. Sundar and J. Light, The personal server: Changing the way we think about ubiquitous computing, Proc. of the 4th Int'l Conf. on Ubiquitous Computing, 2002, pp. 194-209, vol. 2498, Göteborg, Sweden.

* cited by examiner

COLLABORATIVE PHONE-BASED FILE EXCHANGE

BACKGROUND

Mobile phone ownership was a relative rarity 10 years ago. At that time there was about one mobile phone for every five people in the United States. Since then, mobile phone proliferation has continued relentlessly, with many markets nearing saturation worldwide. Parallel advances in cell phone technology have seen such explosive improvements in processing speed, storage capacity, connectivity, battery life and screen resolution that many modern cell phones are more computationally advanced than the desktop computers of 10 years ago. Despite the fact that mobile phones have become a ubiquitous accessory, however, they remain largely underutilized as productivity and collaboration agents.

Every business depends on the free flow of information and ideas to improve their products and services. Effective collaboration between people increases product quality, improves product or project development lead times, and reduces costs. However, effective collaboration is often difficult. For example, a user's work context, including the various documents, emails, links and context history involved in accomplishing work tasks, is typically confined to their office PC, which makes this information difficult to share with others. Furthermore, networking technology is not yet at the point where ubiquitous connectivity to support collaboration can be guaranteed. For example, corporate environments are firewalled, neither WiFi nor cellular data network coverage is universal, and users must opt into cellular data plans at additional cost.

SUMMARY

This Summary is provided to introduce a selection of concepts in a simplified form that are further described in the Detailed Description. This Summary is not intended to identify key features or essential features of the claimed subject matter, nor is it intended to be used to limit the scope of the claimed subject matter.

The present collaborative phone-based file exchange technique uses a mobile phone to provide reliable access to a user's personal data and annex nearby resources to support a rich collaboration experience. The present collaborative phone-based file exchange technique wirelessly synchronizes a user's recent work context on their personal computer (PC), or similar computing device, with his or her mobile phone, and makes this context readily available and sharable in collaborative situations. When the user is away from their PC, collaboration with others is possible by sharing/downloading files between the mobile phone and a PC enabled with a collaborative phone-based file exchange application using a short range wireless network. This PC may be, for example, a colleague's computer or a meeting room computer or workstation. When the user returns to their office, any files recently downloaded to their mobile phone are automatically synchronized back to their office PC.

The benefit of using phone-resident data is that users need not rely on ubiquitous connectivity—collaboration is possible relying only on short range ad hoc transport protocols, such as Bluetooth. Also, because the technique, in one embodiment, employs short range point to point communication, it can often avoid the overhead of user authentication and data encryption.

It is noted that while the foregoing limitations in existing search schemes described in the Background section can be resolved by a particular implementation of the present collaborative phone-based file exchange technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present collaborative phone-based file exchange technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 1:
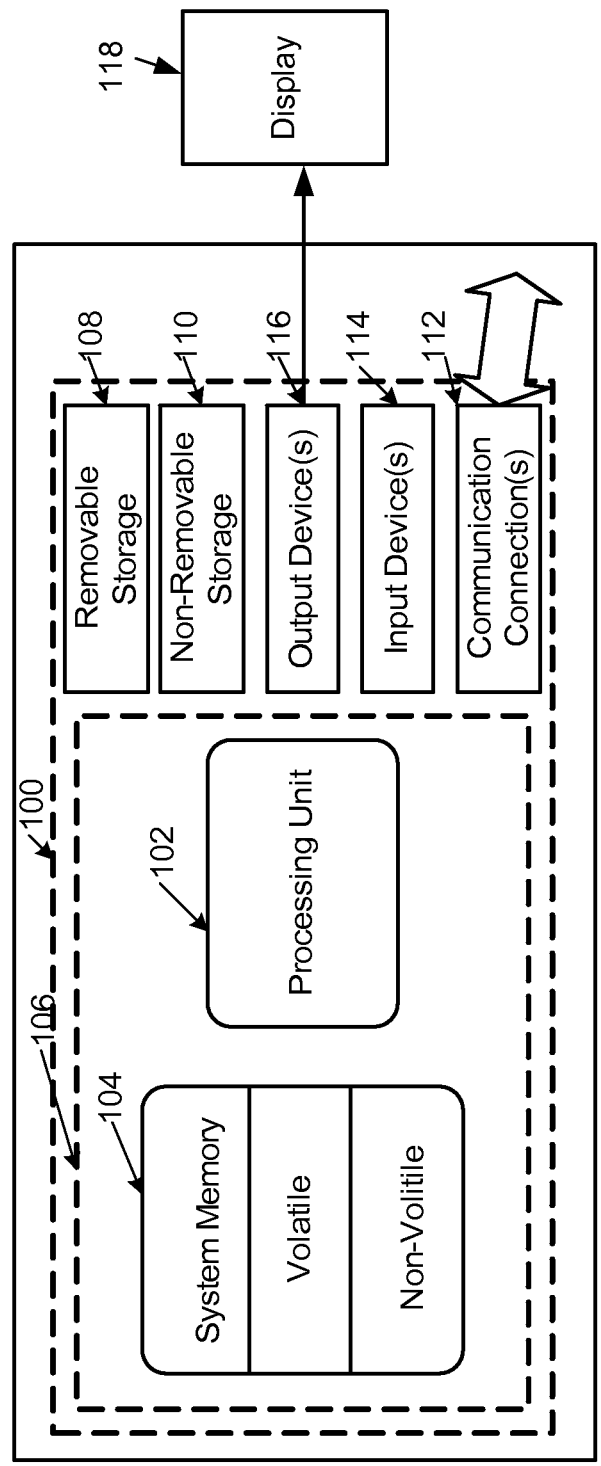
FIG. 1 is a diagram depicting a general purpose computing device constituting an exemplary system for a implementing a component of the present collaborative phone-based file exchange technique.

FIG. 1 illustrates an example of a suitable computing system environment. The computing system environment is only one example of a suitable computing environment and is not intended to suggest any limitation as to the scope of use or functionality of the present collaborative phone-based file exchange technique. Neither should the computing environment be interpreted as having any dependency or requirement relating to any one or combination of components illustrated in the exemplary operating environment. With reference to FIG. 1, an exemplary system for implementing the present collaborative phone-based file exchange technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 has a display 118, and contains communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may have various input device(s) 114 such as a keyboard, mouse, pen, camera, touch input device, and so on. Output device(s) 116 such as a speakers, a printer, additional displays, and so on may also be included. All of these devices are well known in the art and need not be discussed at length here.

The present collaborative phone-based file exchange technique may be described in the general context of computer-executable instructions, such as program modules, being executed by a computing device. Generally, program modules include routines, programs, objects, components, data structures, and so on, that perform particular tasks or implement particular abstract data types. The present collaborative phone-based file exchange technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present collaborative phone-based file exchange technique.

2.0 Collaborative Phone-Based File Exchange Technique

The following sections provide an overview of the present collaborative phone-based file exchange technique, an exemplary operating environment, an exemplary architecture in which the technique can be practiced, exemplary processes employing the technique and exemplary user interfaces.

2.1 Overview

The present collaborative phone-based file exchange technique provides a conveniently-sized device that provides reliable access to a user's personal data and annexes nearby resources to support a rich collaboration experience.

The present collaborative phone-based file exchange technique automatically synchronizes a user's work context with his or her mobile phone, preferably using a wireless network, and makes this context readily available and sharable in collaborative situations. When the user is away from their desk, collaboration with others is possible by sharing/downloading between the mobile phone and a PC enabled with the present collaborative phone-based file exchange technique, which may be a colleague's computer or a meeting room workstation/computer. When the user returns to their office, any recently downloaded files are automatically synchronized back to their office PC. It should be noted that while a PC is referred to in this description of the present technique, this PC could actually be any type of computing device such as that described with respect to FIG. 1.

The present collaborative phone-based file exchange technique employs a set of programs running on a PC and a mobile phone, to facilitate access, display, manipulation and exchange of information resources between a knowledge worker's personal work context and collaborative gatherings.

In one embodiment, the present collaborative phone-based file exchange technique is designed to reliably access files and Uniform Resource Locators (URLs) from users' work context directly on their mobile phones. The present collaborative phone-based file exchange technique accomplishes this through automatic data caching from a user's PC to their mobile phone. An issue, however, is that mobile phone displays are not amenable to collaboration. Their small screen size makes it impractical for several users to collaborate on a set of documents. During face-to-face collaboration, therefore, the present collaborative phone-based file exchange technique assumes users want to see the files on which they are collaborating, and not just transfer them between devices.

The present collaborative phone-based file exchange technique allows a user to display and manipulate the files from users' mobile phones on a shared display. Instead of choosing between true multi-user input (which lacks widespread operating system support) and a more cumbersome approach of passing around a keyboard and mouse, the present collaborative phone-based file exchange technique offers a middle ground: users are given concurrent window-level control over shared documents from their phones. This allows users to perform browsing activities in parallel, but leaves floor control and detailed interaction of a file or document to a single user who is allowed to manipulate a displayed file with the input devices associated with the shared display.

Finally, collaboration involves the exchange of materials. Though email is by far the most common method of information exchange today, it places demands on both sender and receiver; senders must remember what to send and to whom to send it, as well as acquire the addresses of each recipient. Recipients must then file the sent data in a relevant local folder, or remember appropriate search criteria at a later date. The present collaborative phone-based file exchange technique eases the burdens of information exchange by allowing meeting participants to take the data of interest at the time of need, and by propagating and filing it automatically to their desktop PC when they reenter their workspace.

2.2 Exemplary Operating Environment

Figure 2:
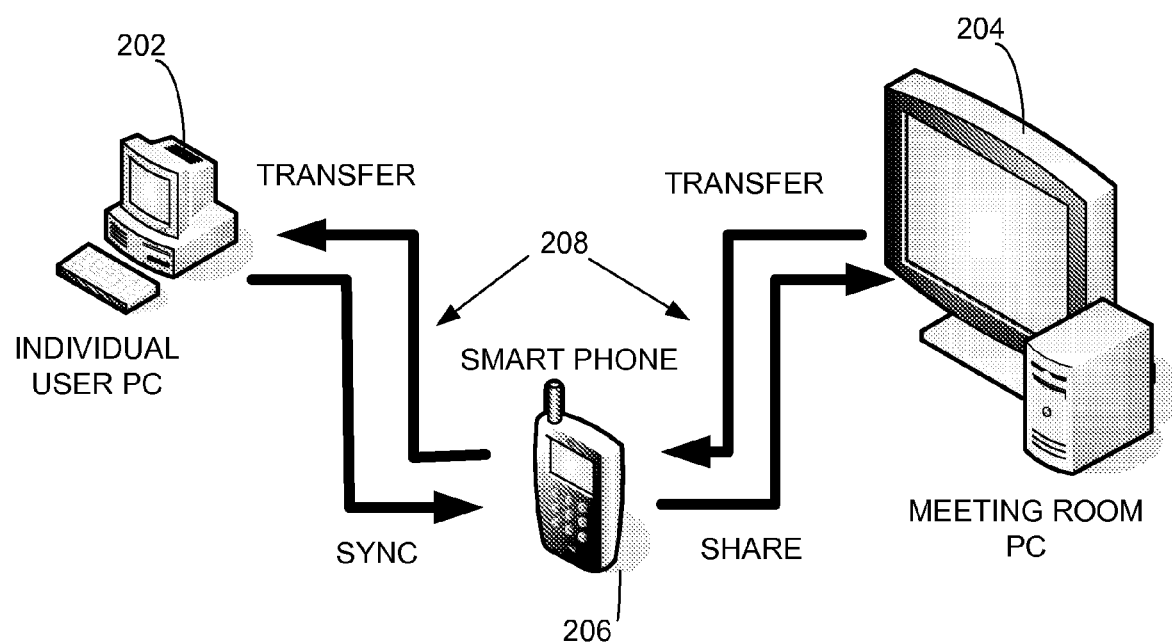
FIG. 2 provides an overview of an operating environment in which the present collaborative phone-based file exchange technique may typically be carried out.

FIG. 2 provides a depiction of a typical environment in which the present collaborative phone-based file exchange technique can be practiced. In a most general sense, the technique can be used to automatically synchronize the files on a user's paired personal computer 202 and the user's mobile phone 204, typically using a wireless network 208. Alternately, the mobile phone 204 can be used in a shared environment via a meeting room PC or some other PC 206.

2.3 Exemplary Architecture of the Present Collaborative Phone-Based File Exchange Technique.

In the present collaborative phone-based file exchange technique, files and information are exchanged between a user's mobile phone and one or more personal computers. Hence, in one embodiment, a collaborative phone-based file exchange application employs two main configurations: a mobile configuration for the mobile phone and a desktop configuration for the PCs that communicate with the mobile phone.

Figure 3:
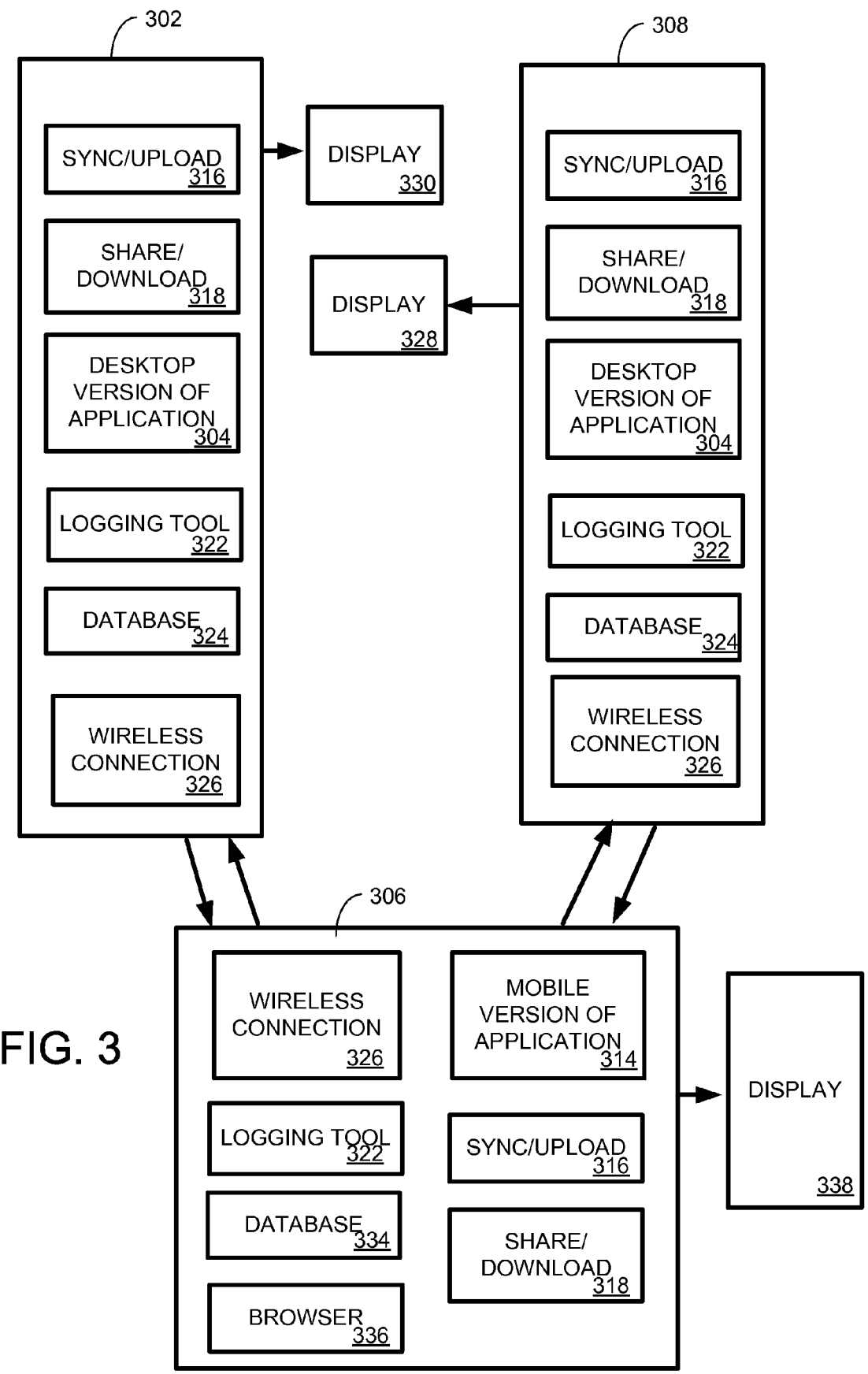
FIG. 3 is a diagram depicting one exemplary architecture of the present collaborative phone-based file exchange technique.

FIG. 3 provides an exemplary architecture wherein the present collaborative phone-based file exchange technique can be practiced. Generally in one embodiment the collaborative phone-based file exchange architecture can include a standard individual user computing device or PC 302 (such as described with respect to FIG. 1). The individual PC 302 has a desktop configuration of the present collaborative phone-based file exchange application 304 installed on it for sending information to, and receiving information from a mobile phone 306. It also has a display 330, a file database 324 and a wireless connection 326. The shared/meeting room PC 308 is similarly configured, with a desktop version of the present collaborative phone-based file exchange application 304 installed on it which can be used for displaying and manipulating files on a shared display 328. The individual user computing device or PC 302, and the shared/meeting room PC 308, could be in one of many configurations such as, for example, a desktop computer, a notebook computers or a Tablet PC, to name a few. It should be also be noted that many mobile phones 306, individual's PCs 302 and shared/meeting room PCs 308 could be employed in the architecture of the present collaborative phone-based file exchange technique.

As mentioned above, the present collaborative phone-based file exchange architecture also has a mobile phone (for example, a Smartphone) 306 with wireless network connectivity 326 (for example, Bluetooth). The mobile phone is also a computing device (for example, such as described with respect to FIG. 1). It has a mobile version 314 of the present collaborative phone-based file exchange application installed on it for sending information to, and receiving information from, the individual user computing device 302 and the shared/meeting room computer 308. Additionally, it has a logging tool 322, a file database 334, a browser 336 and a display 338. These components will be discussed in greater detail in the paragraphs below.

The following paragraphs provide additional details of the desktop and mobile versions of the applications of the present collaborative phone-based file exchange technique.

2.3.1 Desktop Configuration.

One embodiment of the desktop configuration of the present collaborative phone-based file exchange technique offers two independent services: a "sync/upload" service 316, and a "share/download" service 318. In one embodiment it relies on a configuration file, read in on application startup to determine whether to offer sync/upload 316, share/download 318, or both simultaneously. The sync/upload service 316 is designed to maintain a trusted, wireless "pairing" relationship for synchronizing files between a particular user's mobile phone 306 and their own personal computer 302, whereas the share/download service 313 is meant to support a "meeting" scenario which allows multiple concurrent users to join or create a meeting on a shared display 328 and to share or download files. For example, a share/download service 318 might be enabled on a user's PC is to allow visitors to the user's office to share files from their phones. A reason a share/download only configuration might be used is for meeting servers that are not associated with any one user as a PC. In one embodiment, each service is associated with a distinct Bluetooth service Globally Unique Identifier (GUID) so that clients can distinguish the services from one another. Upon startup, each service 316, 318 is preferably launched independently to await connection requests. When a service request from a mobile phone 306 is successfully accepted, a computing device with a desktop version of the application 302, 308 opens a dedicated connection to the device to handle commands, and returns to listening for new service requests from other devices.

2.3.2 Mobile Configuration.

The mobile phone in one embodiment of the present collaborative phone-based file exchange technique is configured with a mobile application of the present technique. The mobile configuration's user interface, which will be described in greater detail later, offers the user the ability to search for and connect to other devices configured with the collaborative phone-based file exchange application that are within range that are publishing the previously discussed desktop configuration share/download service 318. Once connected, the mobile phone configuration 306 works in conjunction with the desktop PC configurations 302, 308 to offer the user the ability to interactively exchange information and documents and control document windows on a shared display 318. Unlike the interactive share/download service 318, the mobile phone's sync/upload activity 316 operates without any user intervention. When the mobile application 314 is running, the sync/upload service 316 performs a periodic scan to determine whether the user's personal (paired) PC 302 is within wireless (e.g., Bluetooth) range. If so, the phone 306 connects to the paired PC and begins the synchronization process by requesting files that have changed since the last update.

In one embodiment, the present collaborative phone-based file exchange technique uses a logging tool 322 on both of the PCs 302, 308 and the mobile phone 306, to track the files and Uniform Resource Locator (URL) access activity that constitutes a user's work context. It is assumed that the files and URLs a user is mostly likely to share are those accessed in the relatively recent past, so the context window is set to a reasonable constant, such as, for example, two weeks. In another embodiment, the context window is controlled by the amount of free disk space available for storing the database and files. In either case the logging tool 322 creates a file database 324 of important documents, URLs and other pertinent files.

Consulting its local logging tool's database 324, the desktop application determines if any files have changed, and if so, sends each new or updated file to the paired mobile phone 306, thereby completing the synchronization process. For example, in one embodiment, for web links, the streamed file is simply a ".url" file containing the URL to the web page, whereas for non-web file types (such as ".doc" or ".pdf" files) the file contents are transmitted in binary format and a full copy is thus created on the receiving device. The mobile phone configuration 306 of the present collaborative phone-based file exchange technique then checks if it has any files downloaded from a shared/meeting room PC 308 or other device enabled with the present collaborative phone-based file exchange technique that have not yet been sent back to the paired PC 302. If so, these files are streamed back to the desktop PC 302, 308 and stored in a folder whose name encodes the time and PC name of the meeting from which the files were obtained, thereby completing the upload process. This two-way sync/upload synchronization is repeated periodically as long as the paired connection is maintained. When the connection is lost, in one embodiment of the present collaborative phone-based file exchange technique, the mobile configuration tries to re-establish it repeatedly on a decaying time schedule with increasingly long pauses between retries.

In one embodiment, the present collaborative phone-based file exchange technique connections adhere to a request/response model with the mobile configuration as the client and the desktop configuration as the server. Each mobile instance is serviced by an independent desktop thread, which allows a device to easily repair a dropped connection, and isolates each device from faults caused by other devices.

2.4 Exemplary Processes Employing the Present Collaborative Phone-based File Exchange.

As discussed above, the present collaborative phone-based file exchange technique can be described in terms of the sync/upload interaction from the viewpoint of the PC and also from the viewpoint of the mobile phone. This interaction takes place when syncing the data between the mobile phone and a user's paired computer. Additionally, the technique can be described in terms of the share/download interaction between the PC in a meeting mode and the mobile phone from the viewpoint of the PC and also from the viewpoint of the mobile phone. This interaction takes place when the mobile phone and a PC are in a meeting/sharing mode. Examples of these processes are discussed in the paragraphs below.

Figure 4:
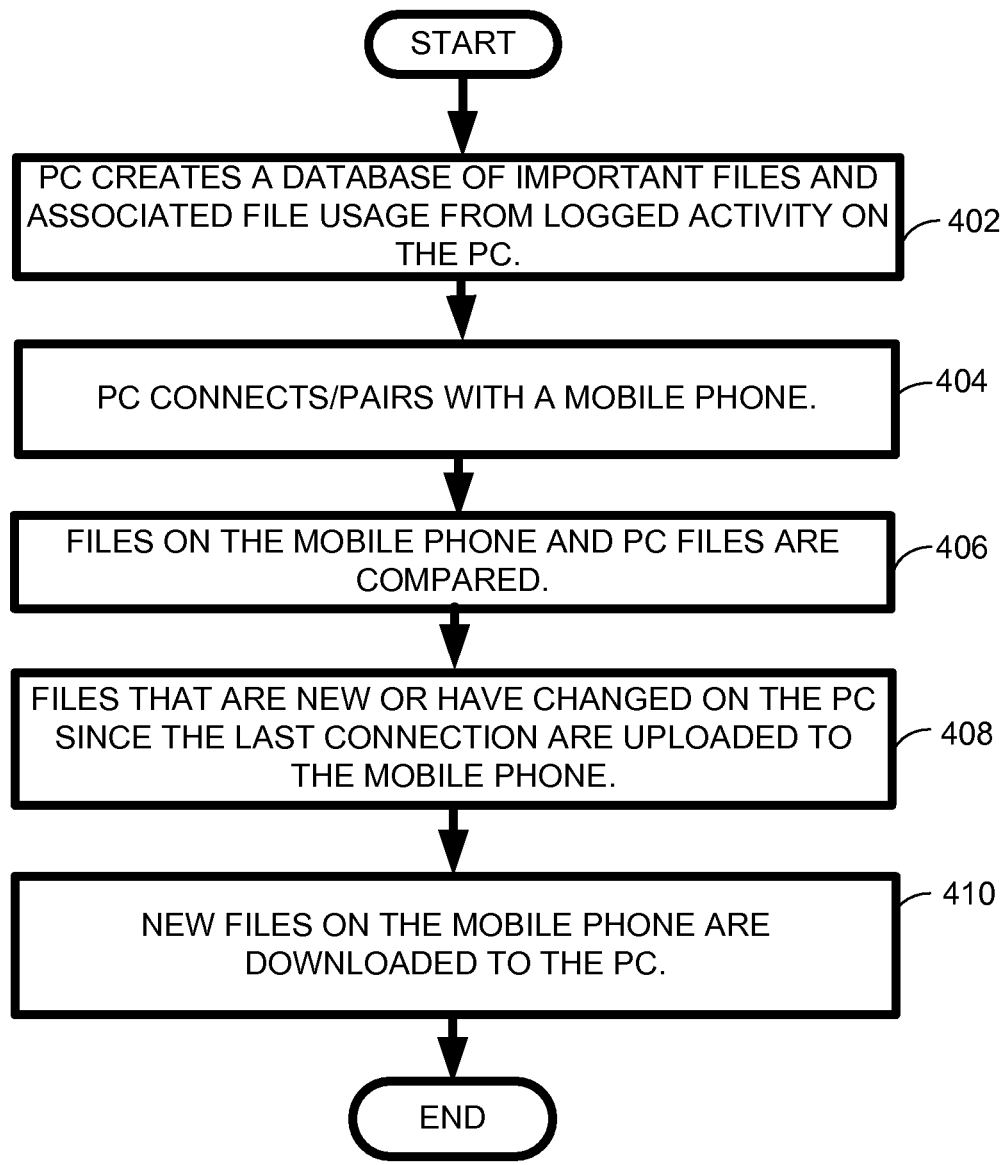
FIG. 4 is a flow diagram depicting an exemplary embodiment of a process employing the present collaborative phone-based file exchange technique in synchronizing files between a mobile phone and a paired PC.

An overview of one exemplary embodiment of the syncing process is shown in FIG. 4. As shown in box 402, a PC creates a database of important files and associated file usage data by logging activity on the PC. The PC then connects/pairs with a mobile phone (box 404) and important files and file usage data on the PC and the mobile phone are compared (box 406). Files that are new or have changed since the last connection between the PC and mobile phone, are transferred to the mobile phone (box 408). Likewise, new files on the mobile phone that have not previously been sent to the paired PC are transferred to the PC (box 410) and may be integrated into its database of important files.

Figure 5:
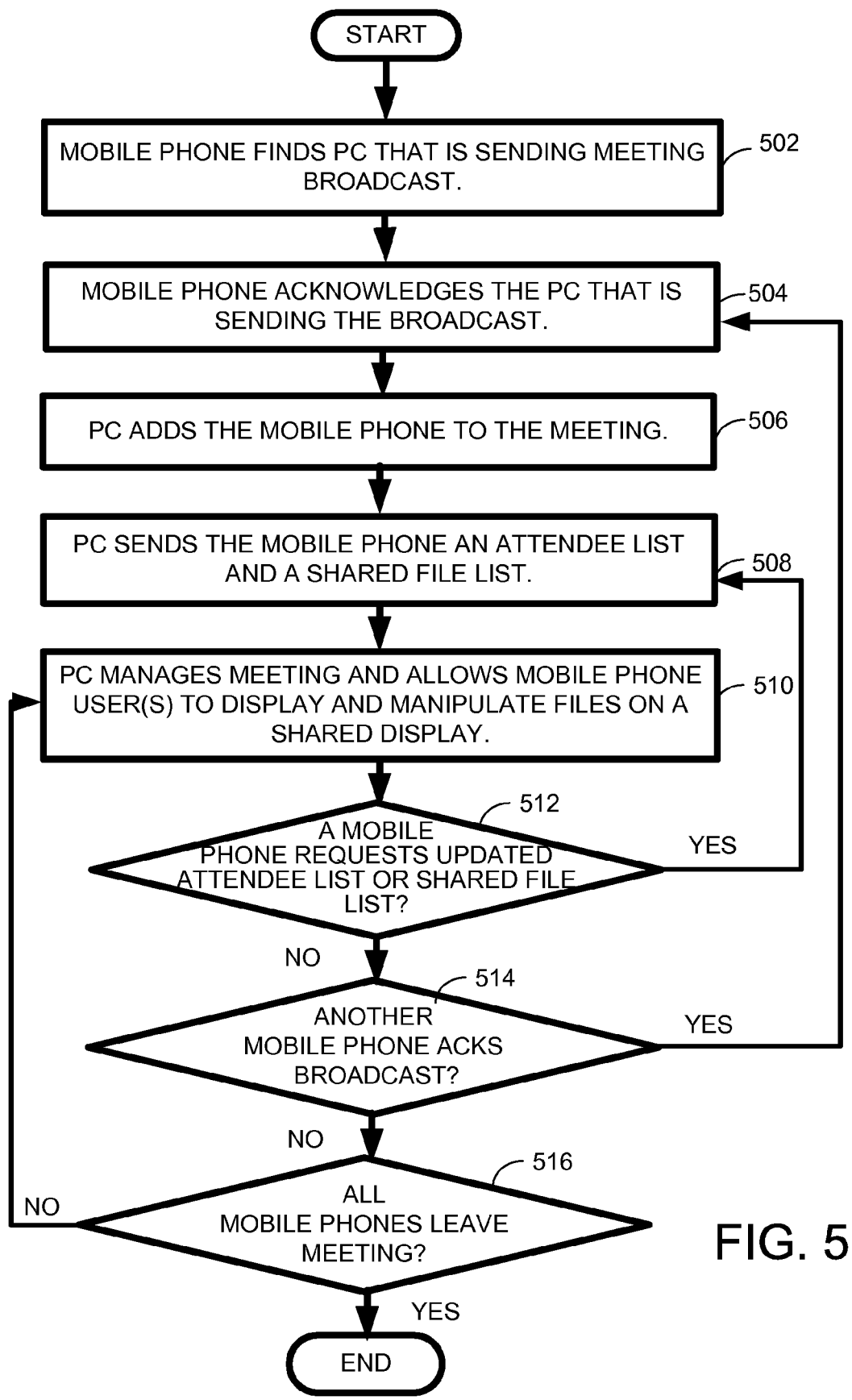
FIG. 5 is a flow diagram depicting an exemplary embodiment of a process employing the present collaborative phone-based file exchange technique in sharing files in a collaborative environment using one or more mobile phones and a PC.

An overview of one exemplary embodiment of the sharing process is shown in FIG. 5. In this embodiment a mobile phone finds a PC that is sending a meeting broadcast (box 502) and acknowledges this PC (box 504). The PC then adds the mobile phone to the meeting (box 506), and sends the mobile phone an attendee list and a shared file list (box 508). The PC then manages the meeting and allows the mobile phone user to display and manipulate files on a shared display (box 510). If a mobile phone requests an updated attendee list or a shared file list, this is sent (boxes 512, 508) If another mobile phone acknowledges the PC's meeting broadcast, the PC repeats the process (boxes 506, 508, 510, 512, 514). Once the last meeting attendee (mobile phone) leaves the meeting (box 516), the meeting ends.

Figure 6:
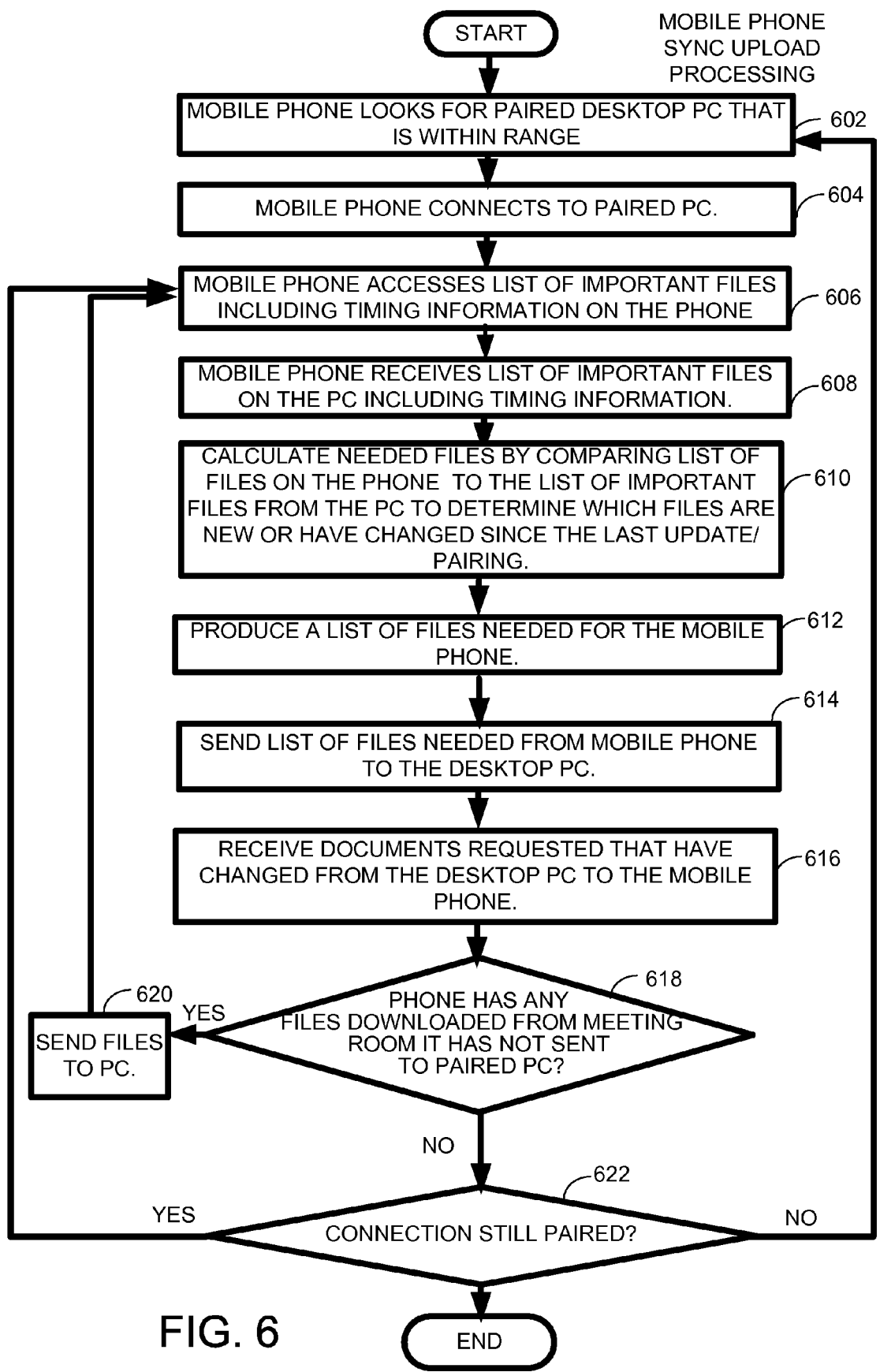
FIG. 6 is an exemplary flow diagram depicting the processing performed by a mobile phone in order to synchronize files with a PC employed in one embodiment of the present collaborative phone-based file exchange technique.

The process shown in FIG. 6 provides an example of the sync/upload processing that occurs at the mobile phone. Initially, the mobile phone looks for a paired desktop computer that is within range (box 602). Typically, in one embodiment, the pairing takes place over a limited range wireless network, such a Bluetooth network. Once the mobile phone finds the paired desktop configuration it connects to it (box 604). It then accesses a list of files on the mobile phone which are time-stamped with the date they were created or last changed (box 606). The mobile phone also receives from the paired PC a list of files that reside on the paired PC (box 608). The list of files on the paired PC are also annotated with information as to when they were created or last changed. The mobile phone then calculates the files it needs by comparing the list of files on the phone to the list of files on the paired PC (box 610). It then produces a list of files it needs (box 612) and sends this list of files to the paired PC (box 614). The mobile phone then receives the files that are new or have changed from the desktop PC (box 616). The mobile phone then checks if it has any files that it downloaded from a meeting room PC or other site that it has not yet sent to the paired PC (box 618). If so, it sends these files to the paired PC (box 620). If the mobile phone does not have any files to send, it continues checking if it is still paired to the desktop PC, and if it is it continues the process until it is not paired anymore (boxes 606 through 622), in which case it attempts to reestablish the paired connection periodically (box 622, 602).

Figure 7:
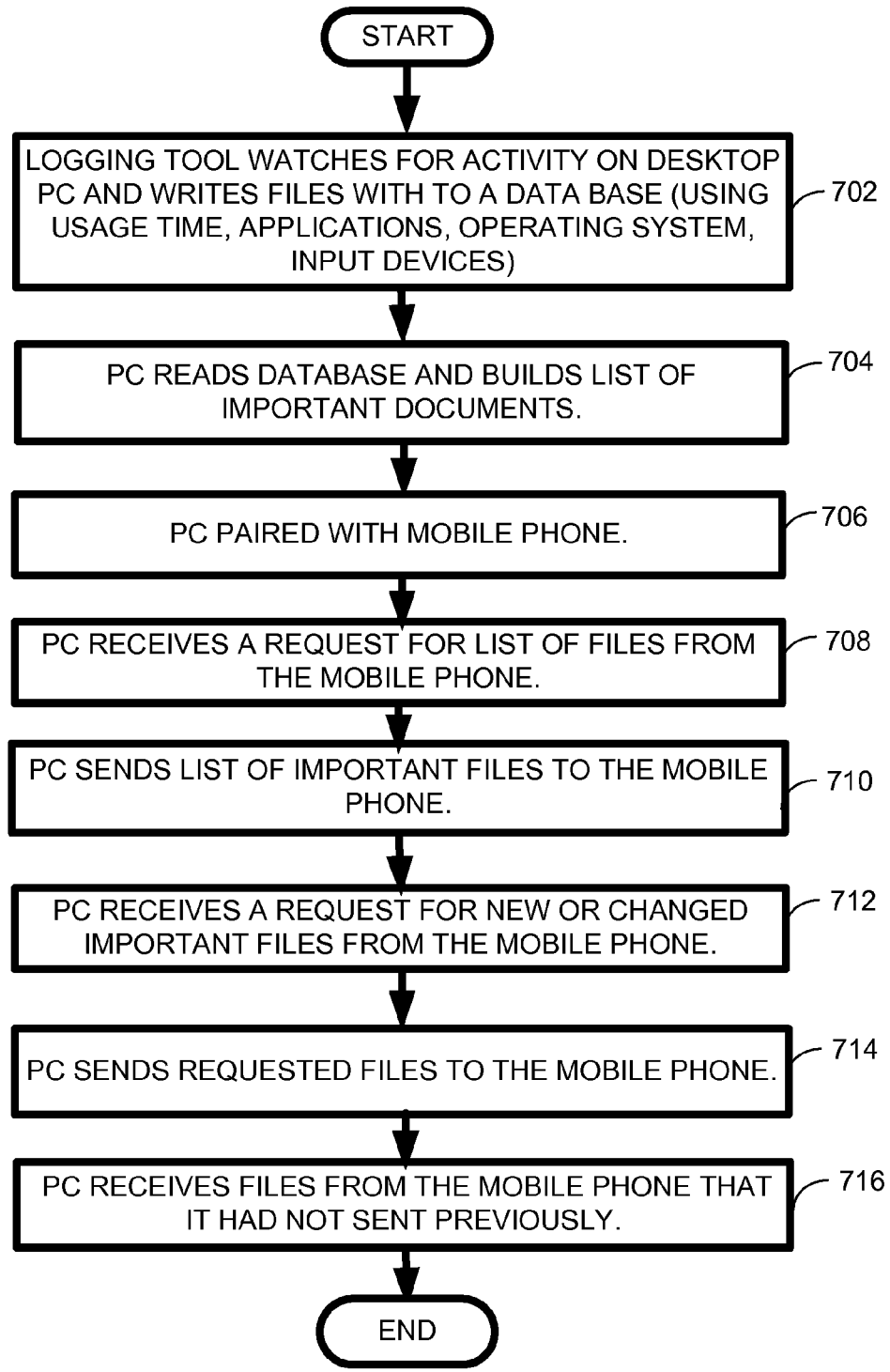
FIG. 7 is an exemplary flow diagram depicting the processing performed by a PC in order to synchronize files with a mobile phone employed in one embodiment of the present collaborative phone-based file exchange technique.

An exemplary process from the point of view of the PC of syncing and uploading files to the paired mobile phone is shown in FIG. 7. At the PC a logging tool continually watches for activity and writes files changed by this activity to a file database (box 702). The logging tool records activity on the PC, for example, activity in applications, the operating system, the activity of input devices and other similar activities, all which are time-stamped. The paired PC reads the database and builds a list of important files that it holds (boxes 704). When the PC pairs to a mobile phone in range and a list of important files is requested by the mobile phone, the paired PC sends the list of the important files to the paired mobile phone (box 706, 708, 710), which, as discussed above, compares this list to the files it holds, and requests files that it needs from the paired PC. (It should be noted that this comparison could equally well be performed by the PC.) The paired PC receives this request (box 712) and sends the requested files to the mobile phone (box 714). Additionally, it receives from the mobile phone new files the phone holds (box 716).

Figure 8:
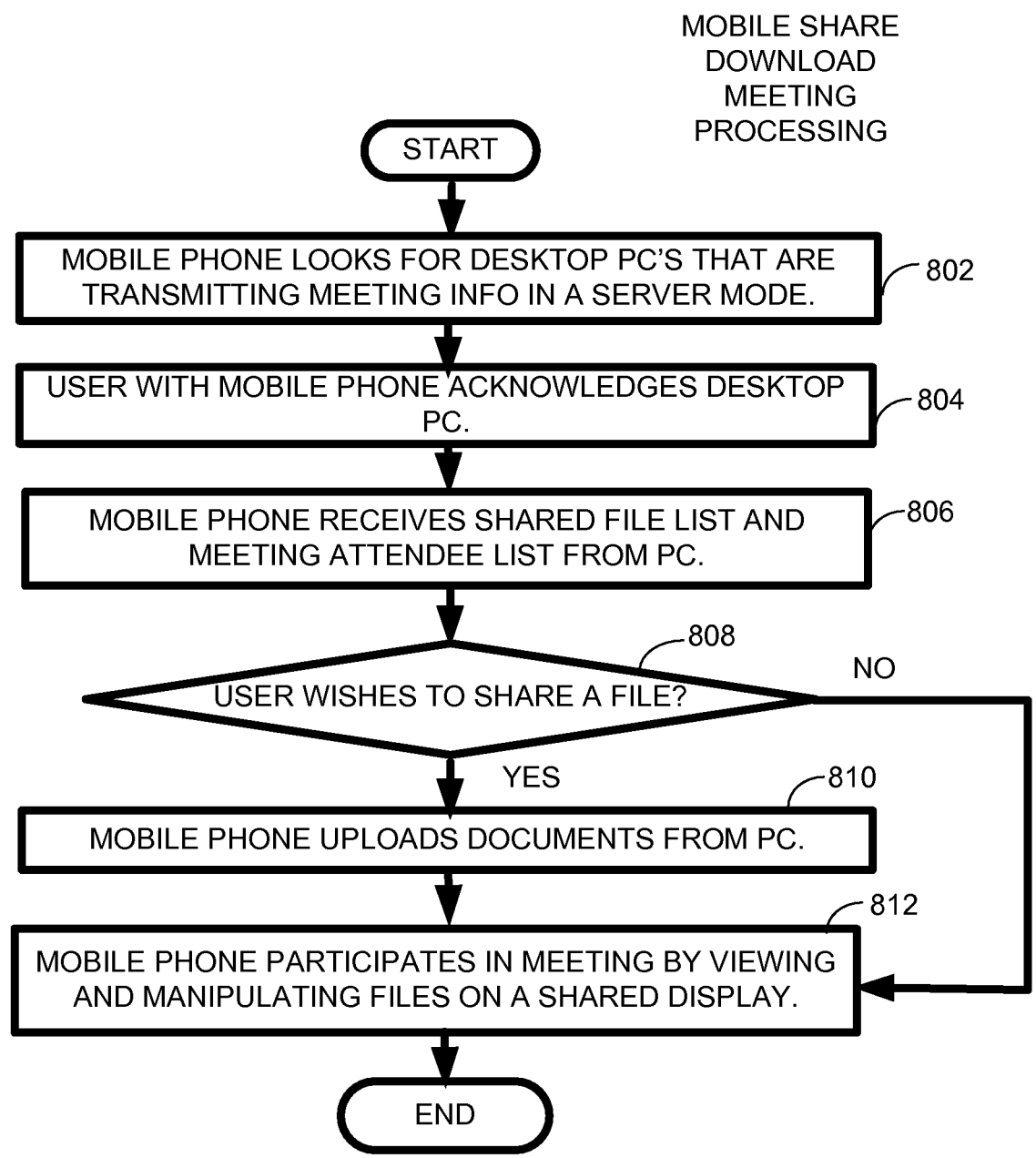
FIG. 8 is an exemplary flow diagram depicting the processing performed by a mobile phone in order to share files in a collaborative environment using a PC employed in one embodiment of the present collaborative phone-based file exchange technique.

An exemplary process wherein a mobile phone shares documents, or joins a meeting, is shown in FIG. 8. This process takes place in a share/download mode. As shown in FIG. 8, the mobile phone looks for a desktop PC that is transmitting a meeting broadcast (e.g., the previously discussed share/download service) on a limited range wireless network (e.g., Bluetooth) (box 802). For example, in one embodiment, the PC adheres to one (and possibly more) standardized service publishing formats. For example, Bluetooth has a standardized way of broadcasting services, which are identified by means of a unique universal identifier. With Bluetooth, the mobile phone first looks for *all* discoverable Bluetooth devices within range, and then checks each to see if they offer the share/download service (a unique universal id). Other service publishing protocols exist and could be used as appropriate, for example 802.11 communication. Once the mobile phone finds the meeting broadcast it acknowledges its presence to the broadcasting PC (box 804). It also receives a list of the shared files and meeting attendee list from the desktop PC (which is typically operating in a server mode) (box 806). If the user wants to share any files, the mobile phone uploads these from the PC (boxes 808, 810). The mobile phone then participates in the meeting by viewing and manipulating files on a shared display (box 812).

Figure 9:
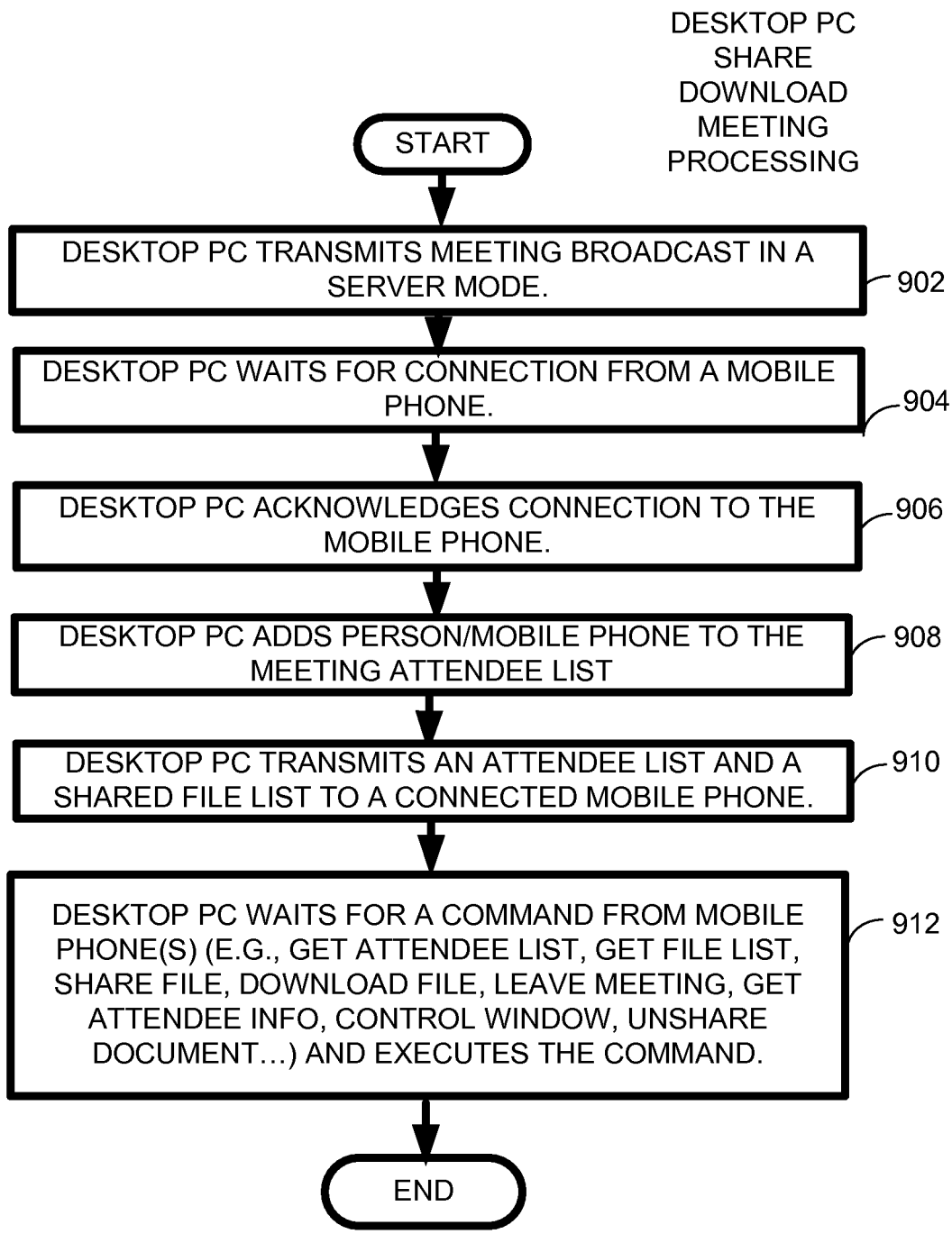
FIG. 9 is an exemplary flow diagram depicting the processing performed by a PC in order to share files in a collaborative environment using one or more mobile phones employed in one embodiment of the present collaborative phone-based file exchange technique.

An exemplary process wherein a PC is in meeting mode is shown in FIG. 9. The PC (operating in a server mode) transmits a meeting broadcast (box 902). It then receives a connection from a mobile phone and acknowledges it (boxes 904, 906). The desktop PC then adds the person corresponding to the mobile phone to the meeting attendee list (box 908) and transmits the attendee list and the list of shared files to the connected mobile phone (box 910). The desktop PC then waits for and executes commands from the connected mobile phone(s) (box 912). These commands can include, for example, requesting a list of meeting attendees, requesting a list of shared files, sharing a file, unsharing a file, downloading a file, requesting attendee details, and commands to control the window of a shared file, to name a few.

2.5 User Interface Design

Figure 10:
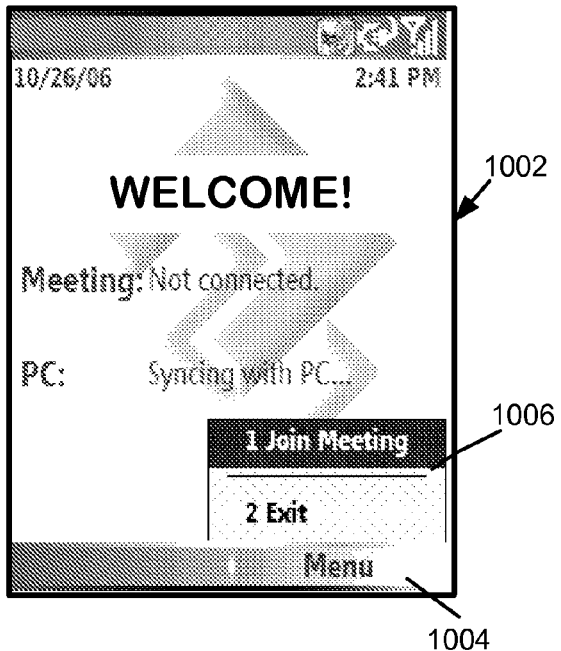
FIG. 10 depicts a start up screen of an exemplary user interface of the present collaborative phone-based file exchange technique.
Figure 11:
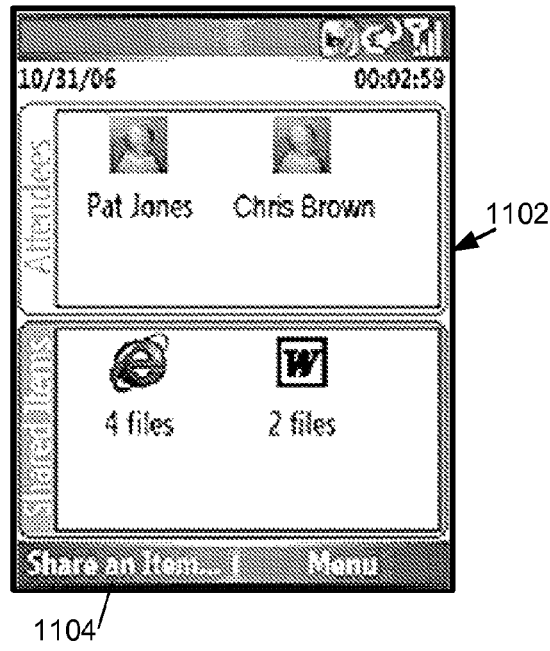
FIG. 11 depicts a status screen of an exemplary user interface of the present collaborative phone-based file exchange technique.

The following section describes exemplary user interface components of one embodiment of the present collaborative phone-based file exchange technique and the workings of the share/download service in greater detail. In one embodiment, on the mobile phone, the present collaborative phone-based file exchange technique offers an initial status screen 1002 (as shown in FIG. 10) of service activity, and a menu of commands at the bottom right 1004. Selecting the "Join Meeting" command 1006 from the menu initiates a search via a limited range wireless network, such as, for example, Bluetooth, and returns a list of available meeting PCs (devices within wireless network range that are publishing the share/download service), allowing the user to select one to connect to. When the first mobile phone connects to a given PC's share/download service, the desktop PC begins a "meeting" by noting the time of connection. It subsequently tracks the number of users connected and the files each have shared, and sends updates of this information to each connected device ("meeting attendee") whenever there are changes. Once having joined to (or started) a meeting, the main mobile meeting screen 1102 (shown in FIG. 11) shows this continually-updated view of meeting status.

Figure 12:
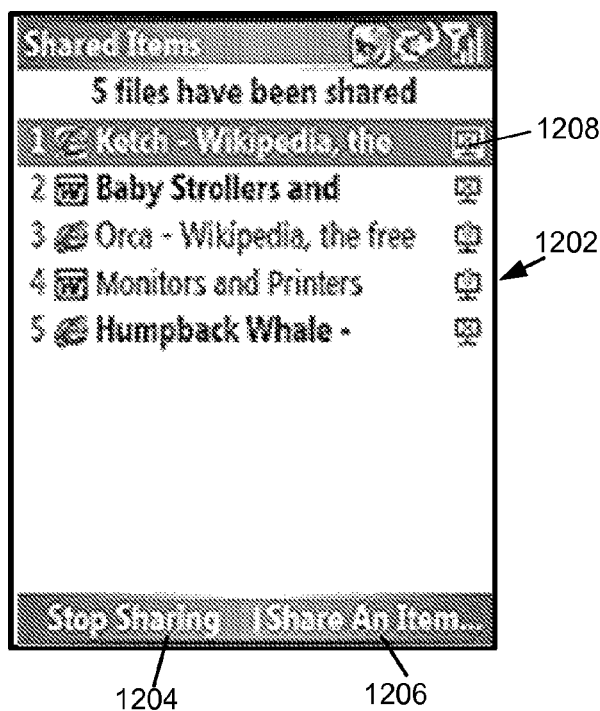
FIG. 12 depicts a shared items screen of an exemplary user interface of the present collaborative phone-based file exchange technique.
Figure 13:
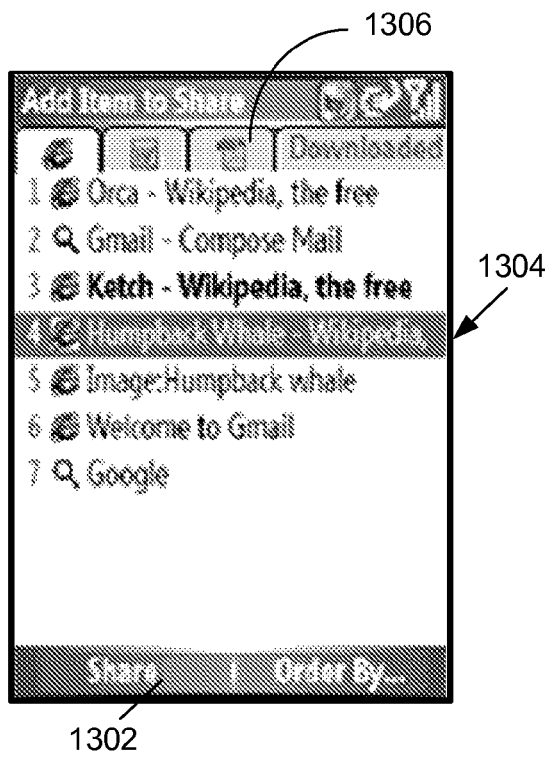
FIG. 13 depicts a screen for sharing items in an exemplary user interface of the present collaborative phone-based file exchange technique.

The Shared Items screen (shown in FIG. 12, 1202) shows a list of all files that are currently available (shared) in the context of the meeting. In this exemplary embodiment, bolded items are those being shared by the phone's user, and non-bolded items are those shared by others. Sharing ownership is important because, in one embodiment, the present collaborative phone-based file exchange technique enforces a semantic that, while shared files can be viewed, manipulated, or downloaded by any attendee, they can only be unshared (revoked from the public meeting) by the attendee that originally shared them. The icons to the right of each line 1208, together with the left context menu, indicate the available operation for each file: "Stop Sharing" 1204 (for files the user has shared) or "Download" (not shown) (for files others have shared). When the user chooses to "Download," the file is streamed from the meeting PC to the local phone. When the user chooses to "Stop Sharing," 1204 1) the shared file is removed from the public meeting lists, 2) the associated window on the meeting PC is closed, and 3) the file is deleted from the meeting PC. (Any copies already downloaded by other attendees are unaffected, however.) In order to share a new item from the mobile phone to the public meeting space, the user selects "Share an Item . . ." 1206, (or 1104 of FIG. 11) from any available menu (e.g. the meeting overview screen in FIG. 11 or the Shared Items screen in FIG. 12). In one embodiment, this takes the user to a specialized file browser 1304 of phone-resident files, as shown in FIG. 13. The file browser 1304 displays local files in a flat list by name rather than in a folder hierarchy by location. To help users find desired items, the files are grouped into separate tabs 1306 by file type; the left/right directional navigation hardware navigates among tabs. Within a tab 1306, users can sort the items by name, length of access, and last access time from the right menu. This information is tracked by the logging tool, which provides document usage information not offered by the file system. In this way, the browser provides a personalized view of a user's files based on their desktop work history. In one embodiment the default ordering of files is by last access time, under the assumption that the files users are most likely to share are the ones they have recently accessed.

Figure 14:
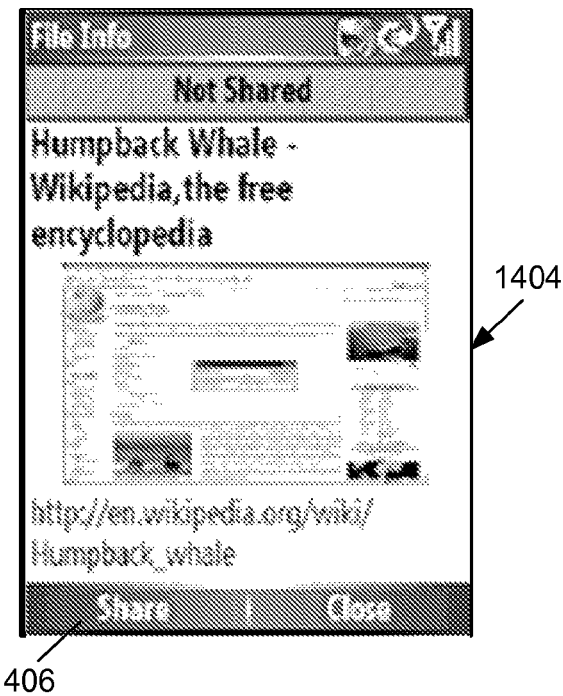
FIG. 14 depicts a file information screen of an exemplary user interface of the present collaborative phone-based file exchange technique.
Figure 15:
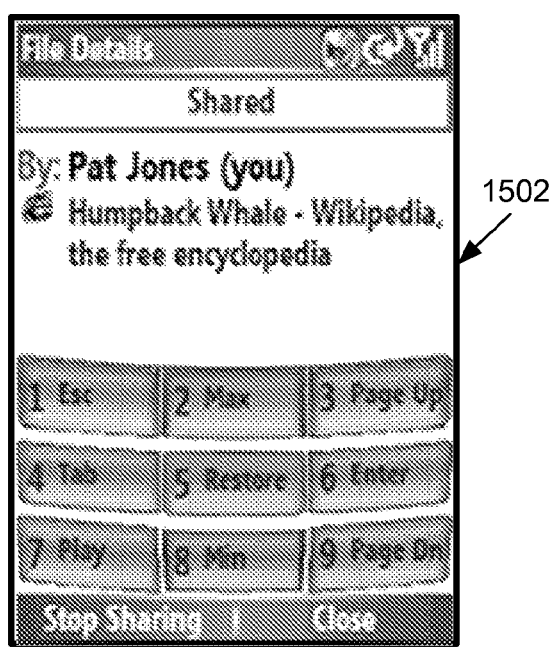
FIG. 15 depicts a file detail screen of an exemplary user interface of the present collaborative phone-based file exchange technique.

In one embodiment, items that are currently being shared are shown in bold. After highlighting a file in the list, the user can choose to share it (if unshared, otherwise the user can choose to unshare it) immediately by pressing the left menu button, or get more information about the file by pressing a select key. In one embodiment, the file details screen 1402 (shown in FIG. 14) shows the title of the file, the URL (for a web file) or original file path (for non-web files), as well as a small thumbnail of the file. The status area 1404 at the top of the details page indicates "Unshared" if the file is not currently shared (or "Shared" if the file is in fact presently shared). When the "Share" menu button 1406 is pressed, the mobile phone streams the file to the meeting PC, where the file is opened, displayed, and made available to other meeting attendees. The file's local status changes to "Shared" and the interface transitions to the Shared File Details screen 1502 (shown in FIG. 15), where the user can proceed to manipulate the file on the shared display. In addition, the Shared File Details screen 1502 is reachable (via the Shared Items list in FIG. 12, 1202) for any shared file in the meeting space. Since each shared file corresponds to an open window on the meeting PC's shared display, this screen offers the user the ability to send various control commands to the open window using the keypad (for instance, scrolling the window contents with '3' or '9' or moving it around the display with the joystick). The PC maintains a mapping between each file and its associated window, and posts messages to that window when control commands (such as move or scroll) come in from any of the connected mobile phones for the corresponding shared file.

The present collaborative phone-based file exchange technique allows people to use their mobile phone to browse their recently-visited URLs and send them to people. Meeting participants can use their phone to send documents and URLs of interest to a large meeting room display. The visuals improve meeting productivity by conveying ideas faster than words. Furthermore, time and effort can be saved since meeting members can use their phones to acquire any or all of the materials presented at the meeting, both as an archive of the topics discussed, and to jump start follow-up research when they return to their offices.

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, although this description refers to a mobile phone, other portable computing devices that have wireless access and are configured with the components of present collaborative file-exchange technique cold be used instead of the mobile phone. This is especially true if such portable computing devices become as ubiquitous as mobile phones are today. The specific features and acts described above are disclosed as example forms of implementing the claims.

Wherefore, what is claimed is:

1. A computer-implemented process for sharing and displaying files using one or more mobile phones and a computing device, comprising:
    a first mobile phone locating a first computing device that is sending a meeting broadcast;
    the first mobile phone acknowledging the meeting broadcast to the first computing device;
    receiving at the first mobile phone meeting parameters from the first computing device; and
    the first mobile phone participating in a meeting wherein the first computing device manages the meeting by allowing one or more mobile phone users to display at least one file during the conduct of a meeting on a shared meeting room display to share and collaboratively manipulate the file displayed on the shared meeting room display as the file is being manipulated using their mobile phones; and
    automatically, without user action, synchronizing any files shared on the shared meeting room display that were downloaded to the first mobile phone to files on a second computing device.

2. The computer-implemented process of claim 1, further comprising:
    a second mobile phone acknowledging the meeting broadcast to the first computing device; and
    the second phone being added to the meeting to display and manipulate files on a shared meeting room display.

3. The computer-implemented process of claim 1 further comprising the first computing device managing the meeting by allowing the one or more mobile phone users to display and manipulate files on the shared meeting room display until all mobile phones disconnect from the meeting.

4. The computer-implemented process of claim 1 wherein a trusted wireless pairing relationship is maintained between the first mobile phone and the second computing device to synchronize the files downloaded to the first mobile phone.

5. The computer-implemented process of claim 1 wherein a mobile phone that has been added to the meeting can upload a file to the first computing device to be shared on the shared meeting room display.

6. The computer-implemented process of claim 5 wherein only a mobile phone that can upload a file to the first computing device to be shared on the shared meeting room display can remove the file from the shared display.

7. The computer-implemented process of claim 1 wherein a mobile phone that has been added to the meeting downloads a file that is being shared on the shared display.

8. The computer-implemented process of claim 1 wherein each of the mobile phones that the one or more mobile phones users use to manipulate files on a shared display further comprise a graphical user interface displayed on a display of their mobile phone, comprising:
    a window for displaying connection status between the mobile phone and the first computing device;
    a window for displaying the status of attendees and shared files;
    a window and controls for displaying and controlling a list of shared files;
    a window and controls for allowing a user to share a file from their mobile phone;
    a window and controls for allowing a user to download a shared file to their mobile phone; and
    a window for displaying file information and window controls for manipulating shared files.

9. The computer-implemented process of claim 1 wherein managing the meeting by allowing one or more mobile phone users to display and manipulate files using their mobile phones on a shared meeting room display, comprises:
    allowing a mobile phone to display a file on a shared meeting room display;
    allowing a mobile phone to remove a file on a shared meeting room display;
    allowing a mobile phone to download a file from the shared meeting room display to the mobile phone;
    obtaining information about a mobile phone user; and
    allowing a mobile phone to control a window displayed on the shared meeting room display.

* * * * *